US006464887B1

(12) United States Patent
de la Bruniere

(10) Patent No.: US 6,464,887 B1
(45) Date of Patent: Oct. 15, 2002

(54) ADJUVANT FOR THE FILTRATION OF LIQUIDS AND ITS USE FOR MICROBIAL DECONTAMINATION

(75) Inventor: Patrick de la Bruniere, Paris (FR)

(73) Assignee: Eurochem, S.A., Paris (FR)

( * ) Notice: Subject to any disclaimer, the term of this patent is extended or adjusted under 35 U.S.C. 154(b) by 0 days.

(21) Appl. No.: 09/685,606

(22) Filed: Oct. 11, 2000

(30) Foreign Application Priority Data

Oct. 11, 1999 (FR) .............................................. 99 12619

(51) Int. Cl.[7] .................................................. C02F 1/50
(52) U.S. Cl. ..................................... 210/764; 210/500.1
(58) Field of Search ............................... 210/764, 500.1

(56) References Cited

U.S. PATENT DOCUMENTS

| 3,061,592 A | * | 10/1962 | Schnell et al. |
| 4,831,061 A | * | 5/1989 | Hilaire et al. |
| 5,169,710 A | * | 12/1992 | Qureshi et al. |
| 6,117,459 A | * | 9/2000 | Van Den Eynde et al. |

FOREIGN PATENT DOCUMENTS

| FR | 2733922 | * | 11/1996 |
| GB | 1436466 | * | 5/1976 |

* cited by examiner

Primary Examiner—Betsey Morrison Hoey
(74) Attorney, Agent, or Firm—Birch Stewart Kolasch & Birch, LLP

(57) ABSTRACT

The invention relates to an adjuvant for the filtration of liquids ensuring the elimination of contaminating microorganisms, which is constituted by polylactam powder obtained by polymerisation of monocyclic lactam by anionic catalysis in an liquid medium. It is particularly intended for integration in a drinkable water preparation process.

11 Claims, No Drawings

ADJUVANT FOR THE FILTRATION OF LIQUIDS AND ITS USE FOR MICROBIAL DECONTAMINATION

The invention relates to an adjuvant for the filtration of liquids ensuring the elimination of contaminating micro-organisms, which is constituted by polylactam powder obtained by polymerisation of monocyclic lactam by anion catalysis in a liquid medium. It is intended, in particular, for integration in a process for preparing drinkable water.

Drinkable water is obtained from water drawn from natural reserves, by decantation, filtration with sand beds and then chemical treatment using chlorine or ozone.

Improvements to these treatments are still under study, in particular with a view to preventing the taste of the water from being denatured by the chemical treatments and, above all, to improve its safety from the bacteriological viewpoint.

Research is primarily devoted, on one hand, to ultrafiltration or nanofiltration with membranes and, on the other hand, to filtration with activated charcoal and with doped activated charcoal.

The best activated charcoal currently used is coconut based (retention capacity from $4.10^7$ to $1.10^8$ $E.$ $coli$ bacteria per cm$^3$). It has proved possible to obtain a better result with silver (pure metal)-doped activated charcoal using a technology developed by Cartis® (retention capacity from $1.5.10^8$ $E.$ $coli$ bacteria per cm$^3$). For reference purposes, sand has a retention capacity representing $2.10^6$ $E.$ $coli$/cm$^3$ bacteria.

The object of the invention is to provide an alternative to activated charcoal, having a higher bacterial retention capacity and permitting simpler, hence less expensive, recycling.

The Applicant has discovered surprising properties in a polylactam powder which, in a hydrated condition, has a high capacity for adsorption and retention of bacteria, yeasts and parasitic micro-organisms.

The Applicant has thus come to contemplate its use as a filtre or as an adjuvant for filtration for decontaminating liquids and, most particularly, for the production of drinkable water.

The properties of the polylactam powder according to the invention are linked with the process for preparing it. This is a variant of a process that is known from, and described in, U.S. Pat. No. 3,061,592 (1962).

This patent describes a process for producing polyamides in the form of spheroidal granules, known as anionic polymerisation (that is to say making use of the opening of the lactam cycle and the generation of a carbanion).

This process includes placing a monocyclic lactam in solution in an organic solvent in which said lactam is soluble, adding a polymerisation catalyst of the alkali metal type and a polymerisation accelerator chosen from the organic isocyanates, carbodiimides and cyanamides, and adding a dispersing agent constituted by polyamide powder and talc. The process then includes heating the mixture at a temperature higher than the melting point of the lactam but lower than that of the polyamide, that is to say in the order of 100 to 150° C. Following polymerisation, the product is hot filtered to remove the non-polymerised lactams, and then washed and dried.

The process is carried out in a liquid medium, by contrast with prior processes in which polymerisation was conducted "in situ" in moulds, which necessitated subsequent mechanical treatment to reduce the mass of polymer to powder.

The patent specifies that the higher the polymerisation temperature, the finer the granules that are obtained and that, on the other hand, a reduction in the speed at which the mixture is stirred causes the formation of granules of larger sizes.

The powder used in the present invention is prepared by polymerisation by anionic catalysis in a liquid medium, as described in U.S. Pat. No. 3,061,592, using:

as a cyclic lactam monomer, lactam 6 or caprolactam, lactam 12 or lauryllactam, or a mixture of the two;

and, as a dispersing agent, micronized silica, which plays the part of a polymerisation initiator. The polymer powder thus obtained has the following characteristics:

it is constituted by particles having, when observed using electron microscopy, a characteristic appearance of small clusters of agglutinated spheres (and not of separate spheres, as with other, similar polymers) with a size of 20 to 80 microns;

these particles present numerous micropores, with sizes ranging from 0.01 to 3 microns.

As will emerge from the examples, the powder according to the invention can be used in a column the lower part of which has a layer of sintered glass and of glass wool; before it is used, the powder must be hydrated to ensure that it is uniformly distributed in the column; the powder is introduced into the column as an aqueous suspension and, after decantation, it is maintained with a surplus of liquid above its upper surface.

The column thus prepared enables liquids artificially contaminated with bacteria or other micro-organisms to be filtered in order to measure the retention capacity of the powder.

The Applicant has thus been able to demonstrate that the powder can retain $10^7$ $E.$ $coli$ bacteria per gram of powder, by filtration of a suspension inoculated with $10^6$ bacteria/ml, with these extreme conditions corresponding to the saturation level of the powder.

Contrary to what is observed in the case of activated charcoal, bacterial retention capacity is not proportional to the specific surface area of the particles, which is only 15 m$^2$/gram; it is far greater, thanks to the existence of micropores inside the particles.

The exceptional bacteria retention capacities of polylactam powder thus brought to light make it a material highly suitable for an additional or alternative step in conventional liquid filtration processes and, more particularly, for making water drinkable by ensuring the microbial decontamination of water taken from a given natural reserve.

The invention thus relates to the use of a polylactam powder as a filtration adjuvant, to replace, or serve as a complement to, the conventional filtration steps currently used in drinkable water preparation processes and, in particular, to replace chemical treatment and/or to replace the activated charcoal filtration step.

Polylactam powder is, furthermore, particularly advantageous as it can be recycled by simple sterilization.

The use of polylactam power can easily be applied on any scale: it can be integrated in an industrial filtration process using columns or cartridges including several layers of filtering material, a process ensuring the purification of water intended for common distribution; it can also be integrated in a portable device also comprising several layers of filtering materials, of the type having a column or a straw for sucking drinks, designed for the decontamination of individual drinking water, in particular for travellers not having access to water of bacteriologically safe quality.

Polylactam powder can also be used as a step preliminary to water filtration, when the water has a high level of contamination. It is used in this case in a batchwise process, thus involving contact between the peviosly hydrated powder, and the contaminated liquid. After contact, with gentle stirring and of a duration sufficient to ensure adsorption of the bacteria, the solution is filtered using conventional methods, for example using a filter of sand or sintered glass, in such a way as to retain the polyfactam polymer that has adsorbed the bacteria and to recover the decontaminated water.

The invention thus also relates to the processes for preparing drinkable water comprising the use of polylactam powder as a filtration adjuvant with a high capacity of retention of microbial contaminants, either as an additional or alternative filtration step, or as a step serving as a preliminary to filtration, said processes being applicable both on an industrial scale and on an individual scale in the form of a portable device.

The following examples illustrate the invention without, however, restricting the scope thereof.

EXAMPLE 1.

Production of Polylactam Powder

The process for producing the polylactam powder is a particular application of a process known and described in 1962 by the Bayer company in U.S. Pat. No. 3,061,592.

The process is applied, as described in said patent, using
- as a monomer, lactam 6, or caprolactam;
- as a solvent, white spirit;
- as a polymerisation catalyst, stearyl isocyanate;
- as a dispersing agent and polymerisation initiator, micronized silica.

The polymerisation reaction is conducted at 140° C.

The polymer powder obtained, referred to hereinafter as 64 B 87, has the following characteristics:
- particles having, when observed using electron microscopy, the appearance of bunches of grapes, with sizes of 20 to 80, microns,
- numerous micropores, with sizes of 0.01 to 3 microns;
- a specific surface area at least equal to 15 $m^2$/gram;
- a melting point of 210 to 215° C.

The powder is preserved in a dry condition.

Before being used and incubated, it must be hydrated (by being placed in solution in a buffer at 110° C. overnight) to prevent a part of the powder from floating on the surface of the liquid to be decontaminated, during its use.

EXAMPLE 2.

Use of the Powder in a Filtration Process of Contaminated Water Using a Column.

The bacteria retention capacity of the 64 B 87 powder was evaluated in a model system, extrapolation from which on a pilot scale is easily conceivable.

The system includes:
- glass columns, the lower ends of which have a layer of sintered glass protected by a pellet of glass wool to prevent it from clogging;
- on the glass wool, a layer of 64 B 87 powder hydrated in a sterile phosphate buffer solution (PBS);
- a set-up composed of a peristaltic pump, a vacuum pump and the necessary tubes and pipes, which permits adjustment of the flow rate of the liquid to be filtered through the column;
- recipients containing the liquids to be filtered, which are, successively:
  sterile PBS solution
  solution inoculated with bacteria
  sterile PBS solution
- bottles for recovering samples of filtrate, intended for counting the bacteria not retained by the filtration system.

Operating Procedure

The entire process is conducted in a phosphate buffer solution (PBS) at a pH of 7.4.

Preparation of the Powder (hydration)

The dried powder is mixed, with stirring, with the PBS buffer, and then placed in an incubator at 110° C. overnight The hydrated powder is then stored in the PBS buffer until used.

Preparation of the Columns

The filtration tests are carried out with columns made of glass and having a diameter of 3 cm. The mass of hydrated powder chosen, 100 g per test, is placed in the column with a surplus of PBS solution. After homogenizing and decanting, the column containing the hydrated powder is sterilized in an autoclave at 121 ° C. for 20 minutes.

All the equipment (bottles, pipes, glass tubes) is also sterilised under the same conditions.

Preparation of the suspensions of *Escherichia coli* bacteria

The suspensions of *Escherichia coli* are prepared from cultures produced in a nutrient culture medium. A given volume of concentrated culture medium is introduced into 1 litre of sterile PBS solution to obtain the desired bacterial solution.

The *Escherichia coli* concentration in the suspension is determined immediately after the suspension has been produced, and the latter is used within a few hours of its preparation.

Filtration Test Set-up

The filtration column is fed with solution for filtering via a peristaltic pump enabling the flow rate of the injected solution to be adjusted.

The bottle containing the solution for filtering is placed on a balance in order to measure accurately the flow rate of injection into the column.

Inside the column, the solution is introduced via a glass tube, the end of which arrives in the surplus buffer solution, in the vicinity of the surface of the powder in order to prevent turbulence and re-suspension of the powder.

At the exit from the column, a vacuum pump is installed to increase and regulate the filtration rate. The filtrate is recovered in a sterile vacuum flask, which is replaced for each fraction sampled.

At the time of testing, the peristaltic pump and the vacuum pump are adjusted in such a way that rate of injection and the rate of sampling are identical and that there are no variations in the level of liquid in the column.

This device makes it possible to ensure a satisfactory, stable, throughput, in the order of 30 ml per minute, throughout the test.

Results

The successively filtered solutions are as follows:
- 500 ml of sterile PBS solution (column sterility control);
- 1000 ml of PBS inoculated with Escherichia coli in a concentration of approximately 106 bacteria/ml;
- 1000 ml of sterile PBS. 7 filtrate sampling operations are performed
- 300 ml of sterile PBS filtrate (after evacuation of the unused volume of the column and of a first fraction of approximately 100 ml);
- 3 fractions of 100 ml of filtrate of the bacteria suspension (at the start of elution after evacuation of the first 100 ml, half way through elution and at the end of elution).

3 fractions of 100 ml of sterile PBS filtrate, under the same conditions.

The results of the experiments are shown in the following table.

TABLE 1

| | Fractions | Concentration of Escherisichia coli/100 ml | | | |
|---|---|---|---|---|---|
| | | Column 1 | Column 2 | Column 3 | Column 4 |
| Initial solution of bacteria | | $8.5\ 10^7$ | $1\ 10^8$ | $8.3\ 10^7$ | $7\ 10^7$ |
| Filtrate of sterile PBS | | 0 | 0 | 0 | 0 |
| Filtrate of inoculated PBS (3 fractions) | 1 | 0 | 0 | 0 | 0 |
| | 2 | 0 | 0 | 0 | 0 |
| | 3 | 0 | 0 | 0 | 0 |
| Filtrate of sterile PBS (3 fractions) | 1 | 0 | 0 | 0 | 0 |
| | 2 | 0 | 0 | 0 | 0 |
| | 3 | 0 | 0 | 0 | 0 |

These results show that, under the experimental conditions applied, 100% of the *Escherichia coli* bacteria are retained on the column of powder.

The maximum quantity of bacteria retained is in the order of $10^9$ for 100 g of hydrated powder (1 litre of filtered solution per column) or $10^7$ E. coli/g of powder.

Complementary Tests

Two of the columns used in the preceding tests (columns 1 and 2) were preserved for one week following the first tests. 48 hours and 7 days after the first tests, 300 ml of sterile PBS were filtered with these columns to detect the presence, if any, of bacteria in the filtrate.

After 48 hours, analyses show the presence of 6 and 10 bacteria/100 ml. This concentration is higher than 300 bacteria/ml after 7 days (60 to 100 colonies/ml of aerobic bacteria revivable at 20° C.).

These results show that *Escherichia coli* bacteria remain viable in the powder and that they can develop therein. The concentrations observed after 7 days' stagnation remain low, however, in relation to the concentrations initially adsorbed.

EXAMPLE 3.

Evaluation of the Capacity of Retention of *E. coli* Bacteria by 64 B 87 Powder

The results given in example 2 having demonstrated the 100% efficiency of bacteria retention by 64 B 87 powder, further tests were conducted adopting the same procedure and with a smaller quantity of powder per column: 35 grams, and with 2 concentrations of bacteria: $4\ 10^7$ and $2.8\ 10^6$ bacteria /100 ml in order to quantify the maximum retention capacity of the powder and to fix a safety level for its use.

The following are filtered, successively:

500 ml of sterile PBS solubon;

and 5 times 1000 ml of PBS inoculated with *E. coli*, and 16 filtrate sampling operations are conducted;

300 ml of PBS filtrate (after evacuation of the dead volume of the column and of the first 100 ml fraction);

and 5 times three 100 ml fractions of the inoculated solution, at different times in the course of filtration (after removal of the first 100 ml).

The results are shown in the following table:

TABLE 2

| | | Concentrations of Escherichia coli/100 ml | | |
|---|---|---|---|---|
| | | Column 1 | Column 2 | Column 3 |
| Initial inoculated solution (average for 5 liters) | | $4\ 10^7$ | $3.9\ 10^7$ | $2.8\ 10^6$ |
| Sterile PBS filtrate (500 ml) | | 0 | 0 | 0 |
| Inoculated PBS filtrate | 1 | 22 | 0 | 0 |
| $1^{st}$ liter | 2 | 26 | 20 | 0 |
| (3 fractions) | 3 | 38 | 0 | 0 |
| $2^{nd}$ liter | 1 | 14 | 0 | 0 |
| | 2 | 70 | 400(*) | 0 |
| | 3 | 22 | 240(*) | 0 |
| $3^{rd}$ liter | 1 | 32 | 46 | 0 |
| | 2 | 10 | 64 | 0 |
| | 3 | 52 | 48 | 0 |
| $4^{th}$ liter | 1 | 14 | 44 | 0 |
| | 2 | 24 | 240 | 2 |
| | 3 | 28 | 360 | 0 |
| $5^{th}$ liter | 1 | 250 | 300 | 0 |
| | 2 | 140 | >1000 | 0 |
| | 3 | 90 | 180 | 0 |

(*) Problem of re-suspension of the powder in the column

At the time of these tests, it emerged that the small volume of powder used increased the risk of preferential paths forming within the power. Furthermore, problems associated with the re-suspension of the powder distorted certain test results.

The results obtained show that filtration is not as efficient as in the first series, probably owing to the conditions of column filling that lead to the creation of preferential paths through the bed of powder.

However, the concentrations of bacteria observed in the filtrate still remain very low in relation to the initial concentrations.

EXAMPLE 4.

Batchwise Use of the Powder

The 64 B 87 powder can also be used batchwise, that is to say by being placed in contact with the suspension of bacteria, in a confined environment. After a chosen period of contact, the suspension is filtered with sterile sintered glass and the bacteria not retained by contact with the powder are counted in the filtrate.

Operating Procedure

A solution of sterile PBS solution is inoculated with *E. coli* bacteria at a final concentration of $5.10^8$/ml. 200 ml sterile bottles are used.

100 ml of *E. coli suspension and* 10 g of sterile powder arentroduced introduced into 5 bottles;

100 ml of sterile PBS are introduced into 1 bottle;

100 ml of *E. coli* suspension are introduced into 1 bottle without powder, to monitor the development of the culture during the course of the experiment.

During contact, the bottles are placed on a stirring table so as to ensure the proper homogeneity of the suspension.

Contact between the suspensions of bacteria and the powder is maintained for 10, 20 and 30 minutes. At the end of the contact period, the contents of each bottle are filtered on sterile sintered glass which retains all of the powder.

The quantity of *E. coli* not retained by the powder, present in the filtrate, is counted.

The results are shown in the following table.

TABLE 3

| | | Concentration of E. coli/ml of filtrate | | | | | |
|---|---|---|---|---|---|---|---|
| Contact time | Bottle without powder | Batch 1 | Batch 2 | Batch 3 | Batch 4 | Batch 5 | Mean |
| 10 mn | $4.0\ 10^8$ | $7.0\ 10^7$ | $7.0\ 10^7$ | $1.0\ 10^6$ | $6.0\ 10^7$ | $5.0\ 10^7$ | $6.25\ 10^7$ |
| 20 mn | $4.9\ 10^9$ | $1.5\ 10^7$ | $1.5\ 10^7$ | $1.7\ 10^7$ | $2.0\ 10^7$ | $1.7\ 10^7$ | $1.68\ 10^7$ |
| 30 mn | $3.4\ 10^8$ | $1.4\ 10^7$ | $7.4\ 10^7$ | $1.1\ 10^8$ | $5.7\ 10^7$ | $6.2\ 10^7$ | $8.96\ 10^7$ |

We observe a reduction in bacterial concentration in the order of 1 logarithm between the quantity measured for the bottles without powder and the mean of the 5 bottles involved in the experiment. According to this procedure, the powder thus ensures the retention of approximately 90% of the bacteria present. Under the test conditions, the powder is already saturated and an increase in the contact time does not improve the results.

EXAMPLE 5.

Evaluation of the Retention Capacity of the Powder with other Test Bacteria

A protocol similar to the one of example 4 was used with bacterial suspensions of Pseudomonas aeruginosa and of Legionella pneumophila.

The bacterial suspensions are prepared in sterile distilled water extemporaneously; 10g of sterilised powder are mixed with 100ml of suspension of titrated bacteria (adjusted to $10^8$ bacteria/ml).

After homogenisation, the mixture is subjected to strring (Autobac® incubator) for 10 or 20 minutes.

Then, the mixture is vacuum filtered with sintered glass. The residual bacteria present in the filtrate are counted in a gelose containing medium (Trypticose®, soya agar made by BioMérieux) in the case of P. aeruginosa and in a Malassez cell (after staining with 0.25% saframine) in that of L. pneumophila. (This bacterium does not stand up very well to this treament and does not form colonies in a reproducible manner after the test, which distorts the count by reinoculation in a gelose type medium).

All the tests are carried out 5 times and a filtration control test using sintered glass without 64 B 87 powder is carried out with each bacterial suspension.

The results are shown in the following tables.

TABLE 4

| | Pseudomonas aeruginosa. $10^8$ bacteria/ml suspension | | | | |
|---|---|---|---|---|---|
| | Bacterial concentration expressed in CFU*/ml in the filtrate | | | | |
| Contact time | Batch 1 | Batch 2 | Batch 3 | Batch 4 | Batch 5 |
| 10 mn | $7.60\ 10^4$ | $2.84\ 10^4$ | $4.80\ 10^4$ | $3.80\ 10^4$ | $2.70\ 10^3$ |
| 20 mn | $1.22\ 10^4$ | $0.44\ 10^4$ | $2.80\ 10^4$ | $1.08\ 10^4$ | $1.60\ 10^3$ |
| Control ($t_0$ without powder, filtered) | $2.23\ 10^8$ | $0.68\ 10^8$ | $2.92\ 10^8$ | $2.90\ 10^8$ | $1.48\ 10^8$ |

*Colony-forming units

We thus observe a reduction in bacterial concentration of 3.27 logarithms after 10 minutes' contact with the powder, and of 3.77 logarithms after 20 minutes.

The same test was carried out with a suspension of $10^{10}$ bacteria/ml. Under these conditions, a reduction of only 0.24 and 0.35 logarithms after 10 and 20 minutes was observed because the powder had reached saturation.

TABLE 5

| | Legionella pneumophila — $10^8$ bacteria/ml suspension | | | | |
|---|---|---|---|---|---|
| | Concentration of bacteria/ml in the filtrate | | | | |
| Contact time | Batch 1 | Batch 2 | Batch 3 | Batch 4 | Batch 5 |
| 10 mn | $0.6\ 10^6$ | $0.5\ 10^6$ | $0.5\ 10^6$ | $6.0\ 10^6$ | $2.3\ 10^6$ |
| 20 mn | $0.2\ 10^6$ | $0.2\ 10^6$ | $1.5\ 10^6$ | $1.0\ 10^6$ | $1.8\ 10^6$ |
| Control ($t_0$ without powder, filtered) | $1.1\ 10^8$ | $0.2\ 10^8$ | $0.5\ 10^8$ | $1.6\ 10^8$ | $3.6\ 10^8$ |

We thus observe a reduction in bacterial concentration of 1.89 logarithms after 10 minutes' contact with the powder, and of 2.34 logarithms after 20 minutes.

The same test was carried out with a suspension of $10^{10}$ bacteria /ml. Under these conditions, we observe a reduction of 0.54 and 1.02 logarithms after 10 and 20 minutes, which indicates that the maximum retention capacity of the powder has practically been reached.

All of the results demonstrate a very high bacterial retention capacity, with specific saturation kinetics for each species of bacterium.

EXAMPLE 6.

Evaluation of the Retention Capacity of the Powder with Parasitic Micro-organisms The procedure is identical with that of example 2, that is to say filtration of artificially contaminated water using a column.

As a model organism representative of parasitic microorganisms, we chose spores of Encephalitozoon intestinalis microsporidia, obtained in the form of a supernatent of cultures of human glioblastoma cells (U 373).

The samples for testing are constituted by 1 ml of a spore suspension at a concentration of $2.10^6$ spores/ml diluted in 9 ml of distilled water.

The spore concentration was evaluated using conventional methods:
either in a Kova cell, according to the following bibliographical references: Dowd, S. E., Gerba, C. P. & Pepper, I. L., 1998. Confirmation of the human pathogenic microsporidia *Enterocytozoon bieneusi, Encephalitozoon intestinalis* and *Vittaforna comeae* in water. Appl. Environ. Microbiol. 9;3332–3335.

Dupont, H. L., Chappell, C. R., Sterling, C. R., Okhuysen, P. CP, J. B and Jakubowski. W. 1995. The infectivity of *Ctyptospotidium parvum* in healthy volunteers; N Engl. J. Med. 332:855–859 or by PCR, according to

Sparfel, J. M., Sarfati, C., Liguory, O., Caroff, B., Dumonfier, N., Guelic, B., Billaud, E., Raffi, F., Molina, J. M., Miegeville, M. & Derouin, F. 1997 Detection of Microsporidia and identification of *Enterocytozoon bieneusi* in surface water by specific PCR, J. Euk. Microbiol.6:78S. using, as a target, the gene coding for the small ribosome subunit of *E. intestinalis*, the "High pure PCR template preparation" DNA extraction kit made by Roche® and the Tagman technique for quantitative evaluation.

The results are shown in the following table:

| | Method of measurement | Number of spores/10 ml before filtration | Number of spores/10 ml after filtration (eluate) |
|---|---|---|---|
| Preliminary test without powder | Counting in Kova cell | $2 \times 10^6$ | $2 \times 10^6$ |
| | Tagman | $3.3 \times 10^5$ | $3.3 \times 10^5$ |
| Test 1 | Counting in Kova cell | $10^6$ | 0 |
| | PCR | + signal | 0 signal |
| Test 2 | Counting in Kova cell | $4 \times 10^6$ | 0 |
| | Tagman | $1.9 \times 10^5$ | 7 |
| Test 3 | Counting in Kova cell | $2.4 \times 10^6$ | 0 |
| | Tagman | $3.3 \times 10^5$ | 0 |

The test does not reveal any spore in the column eluate, either by actual counting or by PCR.

EXAMPLE 7.

Evaluation of the Retention Capacity of the Powder with Yeasts

The procedure is identical to that of example 2.

We chose, as a representative organism, the yeast *Candida albicans.*

Use is made of yeasts freshly cultivated and harvested after 24 hours.

The presence of yeasts in the eluate is evaluated by seeding on Sabouraud gelose, using a rake, in a 9 centimeter Pétri dish; after centrifuging the eluate, the entire pellet is seeded.

The results are shown in the following table:

| | Solution of yeasts prior to filtration | Pellet of the eluate after filtration |
|---|---|---|
| Test I | $10^5$ yeasts/ml | 0 colonies |
| Test II | $2.5 \times 10^7$ yeasts/ml | 0 colonies |
| Test III | $3.5 \times 10^7$ yeasts/ml | 0 colonies |

All of the yeasts are retained by the 64 B 87 powder during filtration using the column.

What is claimed is:

1. An adjuvant for the filtration of liquids capable of retaining contaminant microorganisms comprising a polyactam powder obtained by polymerization of monocyclic lactam by anionic catalysis in a liquid medium.

2. The filtration adjuvant according to claim 1, wherein the polyactam powder is constituted by spherical particles agglutinated in small clusters having a size 20 to 80 microns and which present numerous micropores, of from 0.01 to 3 microns.

3. The filtration adjuvant according to claim 1 or 2, capable of retaining $10^7$ *E.coli* bacteria per gram of powder, after said powder has been hydrated and placed in suspension in wares.

4. The filtration adjuvant according to claim 1 or 2, obtained by polymerization of monocyclic lactam chosen from caprolactam, lauryllactam or a mixture thereof.

5. The filtration adjuvant according to claim 4, obtained by using, as a dispersant and polymerization initiator, micronized silica.

6. A method for the treatment of contaminated water comprising contacting the hydrated powder according to claim 3 with the contaminated water, stirring the water for a sufficient duration to ensure adsorption of the contaminants, and filtering the solution whereby the contaminants are retained in the powder.

7. The method according to claim 6, wherein the hydrated powder is used to replace chlorine in the chemical treatment of water.

8. The method according to claim 6, wherein the powder is used as an additional layer in a column or cartridge type device including several filters.

9. The method according to claim 6, wherein the process is carried out batchwise in a confined environment before the filtering step.

10. The method according to any one of claims 6, 8, or 9, characterized in that it is used on an industrial scale.

11. The method according to claim 6 or 8, characterized in that it is used in a portable device, designed for the decontamination of individual drinking water.

* * * * *